(12) United States Patent
Liu et al.

(10) Patent No.: US 10,997,299 B2
(45) Date of Patent: May 4, 2021

(54) SYSTEM AND METHOD OF AUTHENTICATING AND RESTORING FIRMWARE OF COMPLEX LOGIC DEVICES

(71) Applicant: Dell Products L.P., Round Rock, TX (US)

(72) Inventors: Wei G. Liu, Austin, TX (US); Mukund Purshottam Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 16/299,329

(22) Filed: Mar. 12, 2019

(65) Prior Publication Data

US 2020/0293661 A1 Sep. 17, 2020

(51) Int. Cl.
 *G06F 21/57* (2013.01)
 *H04L 9/32* (2006.01)

(52) U.S. Cl.
 CPC .......... *G06F 21/575* (2013.01); *H04L 9/3242* (2013.01); *H04L 9/3247* (2013.01)

(58) Field of Classification Search
 CPC ...... G06F 9/4405; G06F 21/57; G06F 9/4401; G06F 21/572; G06F 21/575; H04L 9/3247; H04L 9/3242; H04L 9/0643; H04L 9/0891; H04L 9/0894; H04W 12/06; H04W 12/0602; H04W 12/0608
 See application file for complete search history.

(56) References Cited

U.S. PATENT DOCUMENTS

| | | | | |
|---|---|---|---|---|
| 8,874,922 B2* | 10/2014 | Jaber | ...................... | G06F 21/572 713/176 |
| 10,102,378 B2* | 10/2018 | Oh | ......................... | G06F 21/577 |
| 10,263,778 B1* | 4/2019 | Grubin | ................ | H04L 67/1095 |
| 10,713,363 B2* | 7/2020 | Savage | .................... | H04L 63/10 |
| 10,740,111 B2* | 8/2020 | Reddy | ................... | G06F 21/572 |
| 2014/0115314 A1* | 4/2014 | Huang | .................. | G06F 21/575 713/2 |
| 2016/0230179 A1* | 8/2016 | Lee | ......................... | C12N 15/70 |
| 2016/0350538 A1* | 12/2016 | Young | .................... | G06F 9/4406 |
| 2017/0012770 A1* | 1/2017 | Lin | ........................ | H04L 9/0891 |
| 2019/0045358 A1* | 2/2019 | Ahmed | ................. | H04W 12/06 |

(Continued)

Primary Examiner — Raymond N Phan
(74) Attorney, Agent, or Firm — Baker Botts L.L.P.

(57) ABSTRACT

In one or more embodiments, one or more systems, methods, and/or processes may determine multiple digital signatures of respective multiple portions of information handling system firmware that is stored in a non-volatile memory medium of an information handling system; may determine that the multiple digital signatures match respective multiple stored digital signatures; may receive contents of a complex logic device of the information handling system; may determine a digital signature of the contents of the complex logic device; may determine that the digital signature of the contents of the complex logic device does not match a stored digital signature associated with the complex logic device; and, in response to determining that the digital signature of the contents of the complex logic device does not match the stored digital signature associated with the complex logic device, may program the complex logic device with a complex logic device firmware image.

20 Claims, 5 Drawing Sheets

(56) References Cited

U.S. PATENT DOCUMENTS

2019/0053290 A1* 2/2019 Raju ................... H04W 40/244
2019/0065786 A1* 2/2019 Young .................. H04L 9/0891
2019/0073478 A1* 3/2019 Khessib ................ G06F 21/572

* cited by examiner

SYSTEM AND METHOD OF AUTHENTICATING AND RESTORING FIRMWARE OF COMPLEX LOGIC DEVICES

BACKGROUND

Field of the Disclosure

This disclosure relates generally to information handling systems and more particularly to utilizing complex logic devices with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine multiple digital signatures of respective multiple portions of information handling system firmware that is stored in a non-volatile memory medium of an information handling system; may determine if the multiple digital signatures match respective multiple stored digital signatures; if the multiple digital signatures do not match the respective multiple stored digital signatures, may store an information handling system firmware image in the non-volatile memory medium of the information handling system; if the multiple digital signatures match the respective multiple stored digital signatures, may receive contents of a complex logic device of the information handling system; may determine a digital signature of the contents of the complex logic device; may determine that the digital signature of the contents of the complex logic device does not match a stored digital signature associated with the complex logic device; and, in response to determining that the digital signature of the contents of the complex logic device does not match the stored digital signature associated with the complex logic device, may program the complex logic device with a complex logic device firmware image.

In one or more embodiments, a first portion of the multiple portions of information handling system firmware may include an initial boot block. In one or more embodiments, a first portion of the multiple portions of information handling system firmware may include a stored digital signature of the multiple stored digital signatures associated with a second portion of the multiple portions of information handling system firmware. In one or more embodiments, the information handling system may include a boot management controller. For example, the boot management controller may store the complex logic device firmware image. For instance, programming the complex logic device with the complex logic device firmware image may include the boot management controller programming the complex logic device with the complex logic device firmware image.

In one or more embodiments, in response to determining that the digital signature of the contents of the complex logic device does not match the stored digital signature associated with the complex logic device, the information handling system firmware may provide a command to the boot management controller to program the complex logic device the complex logic device firmware image. In one or more embodiments, in response to determining that the digital signature of the contents of the complex logic device does not match the stored digital signature associated with the complex logic device, the information handling system firmware may boot into a firmware update mode. In one or more embodiments, the information handling system firmware may store a complex logic device key. In one example, determining the digital signature of the contents of the complex logic device may include combining the contents of the complex logic device and the complex logic device key. In another example, determining the digital signature of the contents of the complex logic device may include determining a hash value of a combination of the contents of the complex logic device and the complex logic device key as the digital signature of the contents of the complex logic device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a complex logic device (CPLD) may control a power sequencing of an information handling system. In one or more embodiments, the CPLD may control input/output (I/O) of the information handling system during the power sequencing of the information handling system. In one or more embodiments, the CPLD may contribute a root of trust (RoT). For example, the RoT may authenticate various portions of a start sequence of the information handling system. For instance, the RoT may authenticate firmware of one or more components that may be utilized in the start sequence of the information handling system.

In one or more embodiments, security of the information handling system may be based at least on an integrity of firmware of the CPLD. For example, the security of the information handling system may depend on the integrity of firmware of the CPLD. In one or more embodiments, firmware for a CPLD that is signed may provide better security for an information handling system than firmware for a CPLD that is not signed. In one example, firmware for a CPLD that is signed may reduce one or more threats from one or more cyber attacks. In a second example, firmware for a CPLD that is signed may reduce one or more threats from one or more physical attacks. In a third example, firmware for a CPLD that is signed may reduce one or more threats from one or more supply chain attacks. In another example, firmware for a CPLD that is signed may reduce one or more threats from a person with a CPLD programmer. In one or more embodiments, firmware for a CPLD that is signed may be utilized in determining if the firmware for the CPLD has been compromised and/or has been tampered with.

In one or more embodiments, an information handling system may include a boot management controller. For example, the boot management controller may be or include a remote access controller. In one or more embodiments, the information handling system may include the boot management controller as a RoT. For example, the boot management controller may receive power before permitting the information handling system to boot. For instance, the boot management controller may authenticate one or more portions of information handling system firmware (IHSFW). In one or more embodiments, the boot management controller may authenticate the one or more portions of the IHSFW before releasing at least one processor of the information handling system from a reset state and/or mode. For instance, the boot management controller may access the IHSFW via a serial peripheral interface (SPI). In one or more embodiments, IHSFW may include processor instructions executable by at least one processor of the information handling system. For example, IHSFW may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one or more embodiments, a non-volatile memory medium may store the IHSFW. For example, the non-volatile memory medium that stores the IHSFW may be accessible via a SPI.

In one or more embodiments, after a first portion of the IHSFW is authenticated, a second portion of the IHSFW may be authenticated. In one example, the first portion of the IHSFW may include an initial boot block (IBB). For instance, after the IBB is authenticated, the second portion of the IHSFW may be authenticated. In a second example, the second portion of the IHSFW may include pre-EFI initialization (PEI) instructions. For instance, after the PEI instructions are authenticated, a third portion of the IHSFW may be authenticated. In a third example, the third portion of the IHSFW may include memory reference code (MRC). For instance, after the MRC is authenticated, a fourth portion of the IHSFW may be authenticated. In another example, the fourth portion of the IHSFW may include a driver execution environment (DXE). For instance, the DXE may load device drivers for devices of the information handling system. In one or more embodiments, after the DXE is authenticated, another portion of the IHSFW may be authenticated. For example, after the DXE is authenticated, a fifth portion of the IHSFW may be authenticated.

Figure 1:
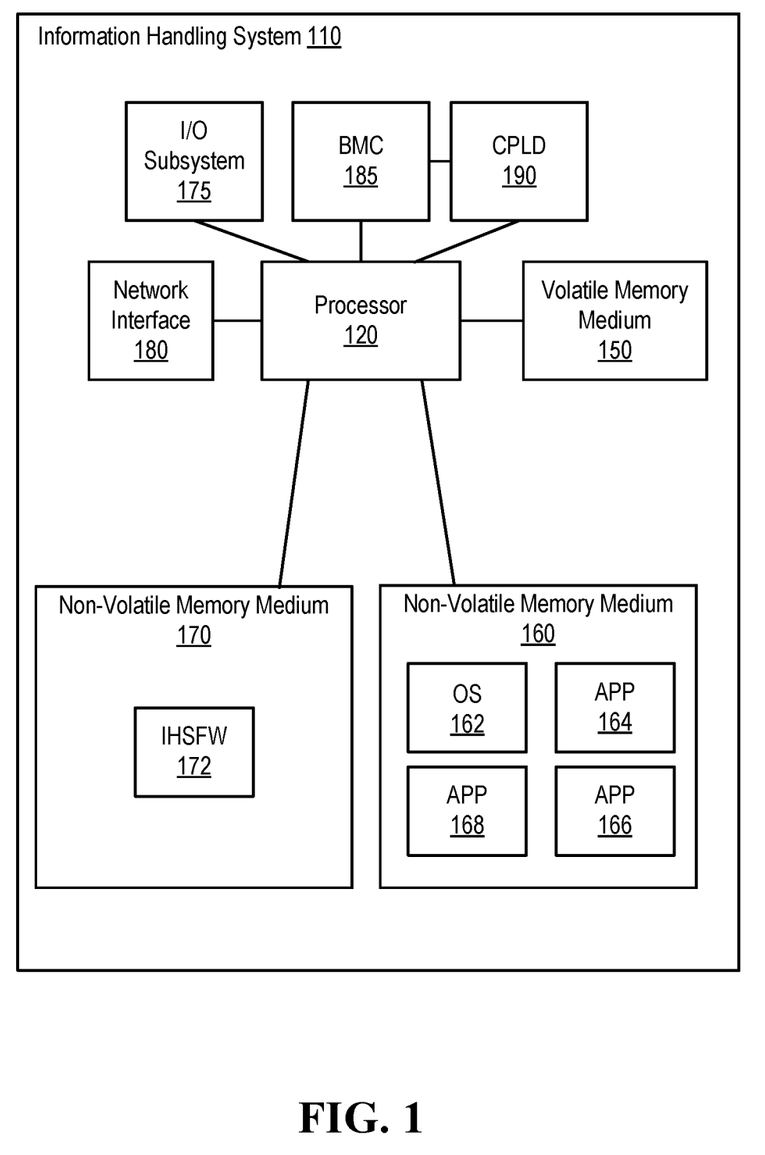
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a SPI bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in nonvolatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a boot management controller (BMC) 185, and a CPLD 190. In one or more embodiments, BMC 185 may be or include a baseboard management controller. As illustrated, volatile memory medium 150, non-volatile memory media 160 and 170, I/O subsystem 175, network interface 180, BMC 185, and CPLD 190 may be communicatively coupled to processor 120. As shown, CPLD 190 may be communicatively coupled to BMC 185. Although not specifically illustrated, CPLD 190 may be coupled to other components of IHS 110, according to one or more embodiments.

In one or more embodiments, one or more of volatile memory medium 150, non-volatile memory media 160 and 170, I/O subsystem 175, network interface 180, BMC 185, and CPLD 190, among others, may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, CPLD 190 may provide power sequencing to components of IHS 110. For example, CPLD 190 may control power sequencing of components of IHS 110. In one or more embodiments, CPLD 190 may provide on or more configuration settings to one or more components of IHS 110. For example, CPLD 190 may provide on or more configuration settings to the one or more components of IHS 110 via GPIO. In one or more embodiments, IHS 110 may include a non-volatile dual in-line memory module (NVDIMM). For example, CPLD 190 may provide one or more signals to the NVDIMM to instruct the NVDIMM to store data of a volatile memory medium of the NVDIMM to a non-volatile memory medium of the NVDIMM.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include IHSFW 172. In one or more embodiments, IHSFW 172 may include processor instructions executable by processor 120. For example, IHSFW 172 may include one or more structures and/or one or more functionalities of and/or compliant with one or more of a BIOS, an EFI, a UEFI, and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M02, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated). In one or more embodiments, a CPLD may include one or more structures and/or one or more functionalities of a FPGA and/or one or more structures and/or one or more functionalities of a programmable array logic (PAL), among others.

Figure 2:
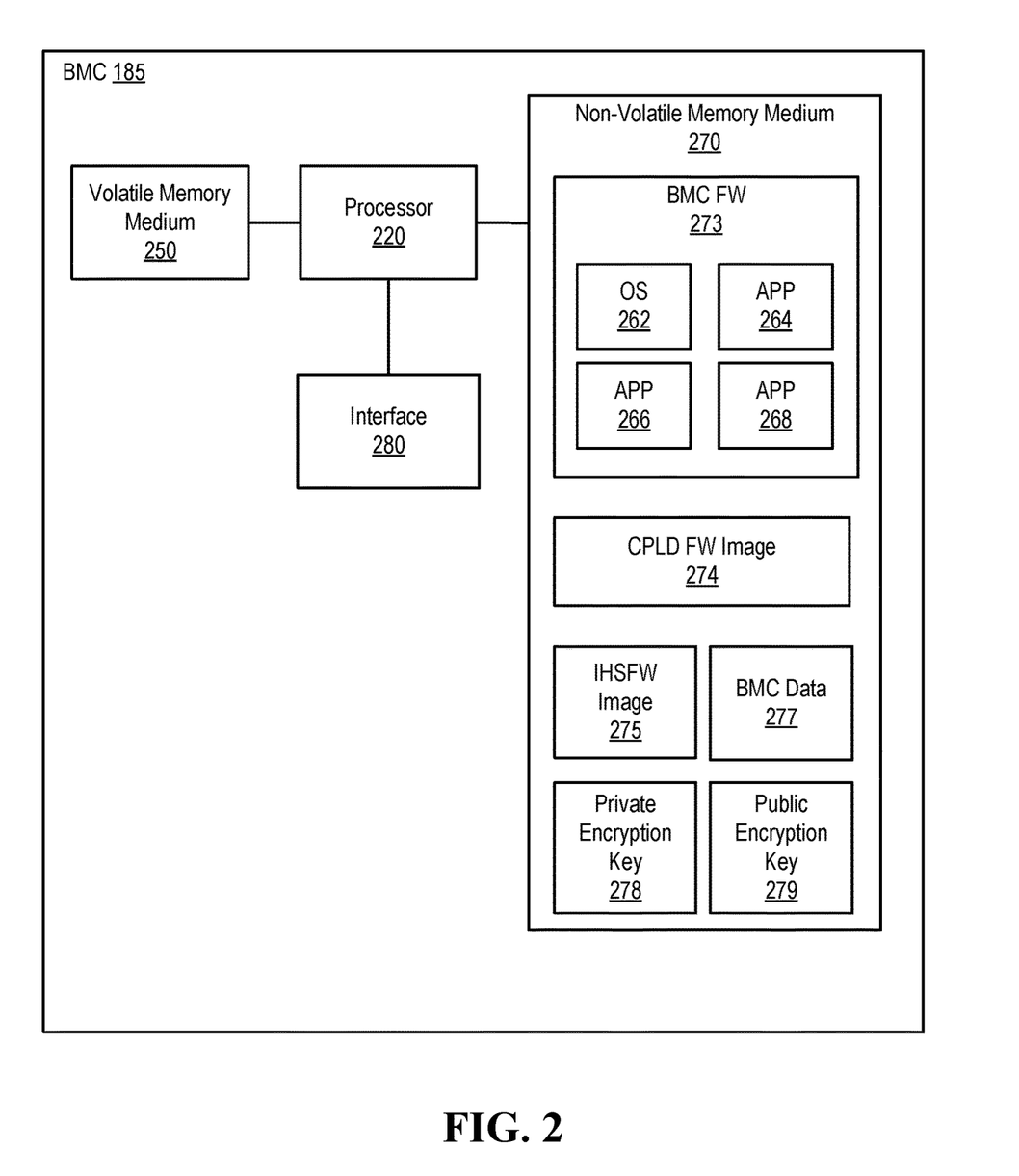
FIG. 2 illustrates an example of a boot management controller, according to one or more embodiments.

Turning now to FIG. 2, an example of a boot management controller is illustrated, according to one or more embodiments. As shown, BMC 185 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). In a second example, OS 262 may be or include an Unix-like operating system. In another example, OS 262 may be or include a portable operating system interface (POSIX) compliant operating system.

As illustrated, non-volatile memory medium 270 may include a CPLD firmware (FW) image 274. In one or more embodiments, CPLD FW image 274 may include firmware for CPLD 190. As shown, non-volatile memory medium 270 may include an IHSFW image 275. As illustrated, non-volatile memory medium 270 may include a private encryption key 278. As shown, non-volatile memory medium 270 may include a public encryption key 279. In one or more embodiments, private encryption key 278 and public encryption key 279 may be asymmetric encryption keys.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/ output (GPIO) circuitry, and the GPIO circuitry may enable one or more interrupt signals to be received and/or provided via at least one interrupt line. In a second instance, interface 280 may include GPIO circuitry that may enable BMC 185 to provide and/or receive signals associated with other circuitry (e.g., diagnostic circuitry, etc.). In a second instance, interface 280 may include GPIO circuitry that may enable BMC 185 to provide and/or receive signals associated with CPLD 190, among others. In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with one or more of systems, flowcharts, methods, and/or processes described herein. For example, non-volatile memory medium 270 and/or volatile memory medium 260 may store instructions that may be executable in accordance with one or more of systems, flowcharts, methods, and/or processes described herein. In one or more embodiments, processor 220 may execute instructions in accordance with at least a portion of one or more of systems, flowcharts, methods, and/or processes described herein. For example, non-volatile memory medium 270 and/or volatile memory medium 260 may store instructions that may be executable in accordance with at least a portion of one or more of systems, flowcharts, methods, and/or processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3A:
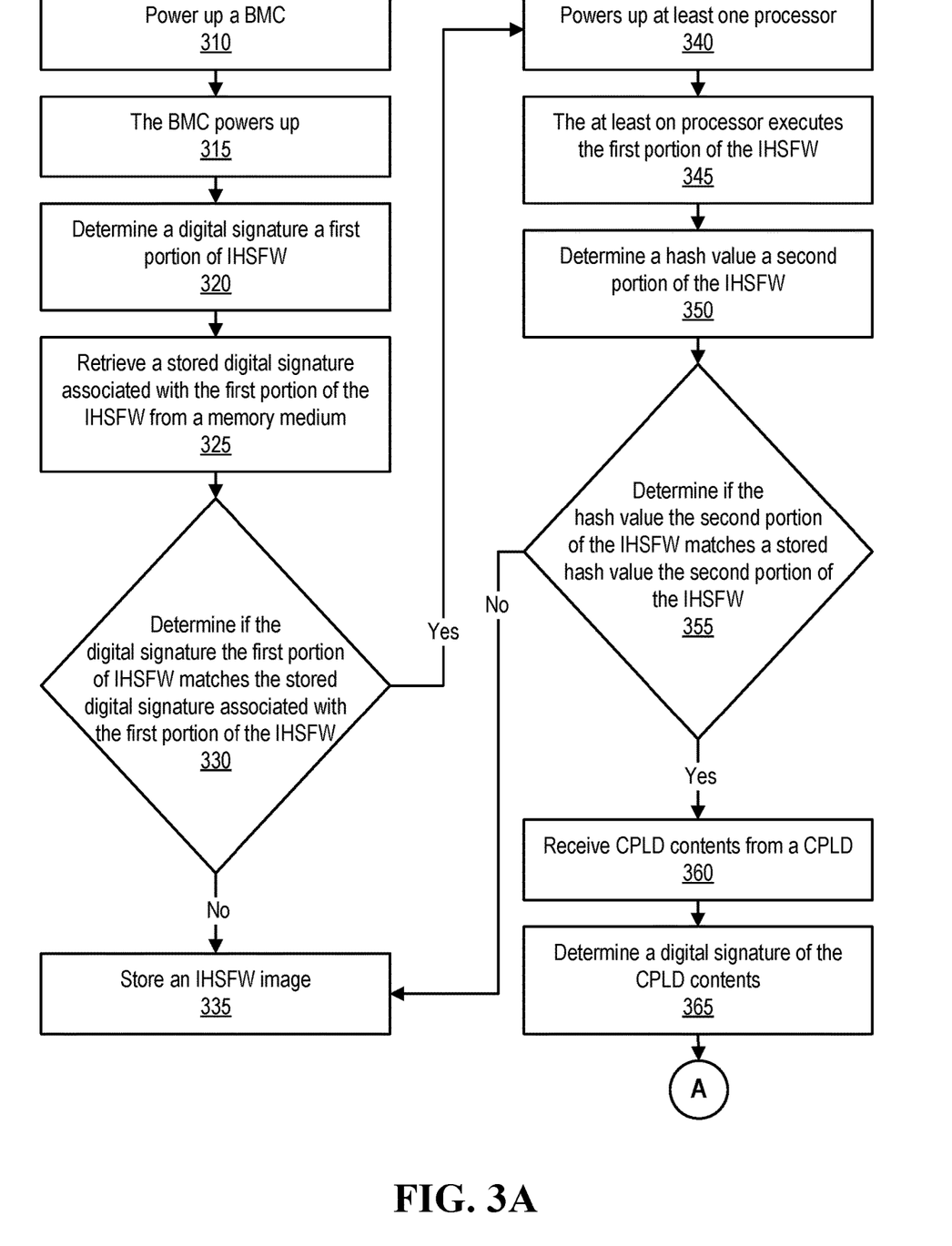
FIGS. 3A and 3B illustrate an example of a method of utilizing an information handling system, according to one or more embodiments.
Figure 3B:
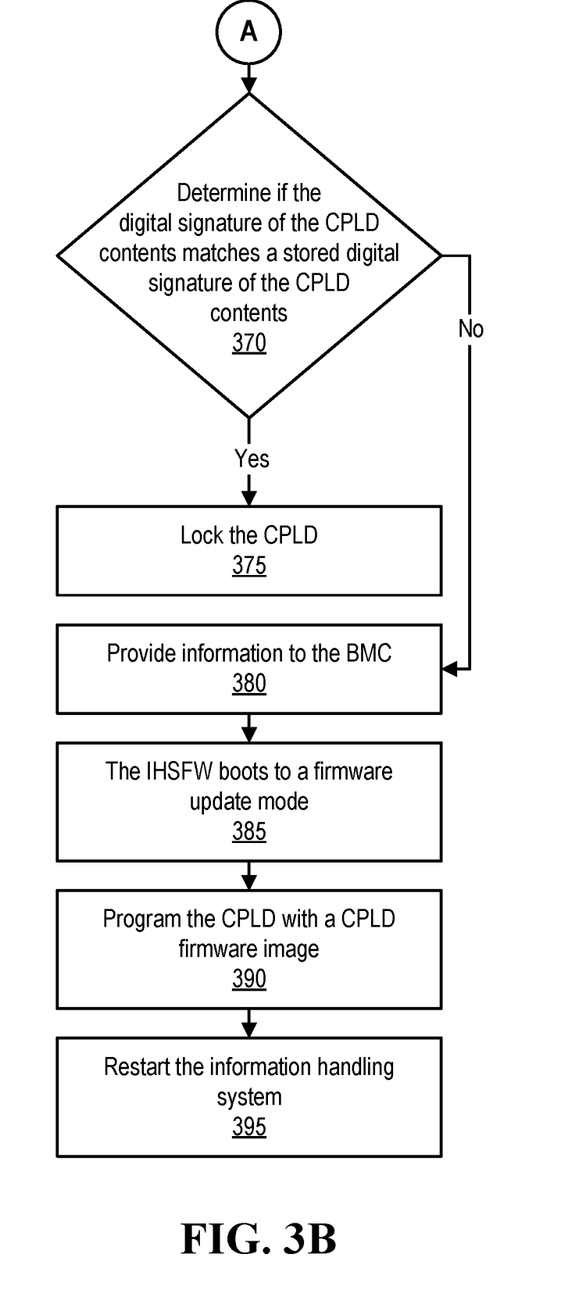

Turning now to FIGS. 3A and 3B, an example of a method of utilizing an information handling system is illustrated, according to one or more embodiments. At 310, a BMC may be powered up. For example, CPLD 190 may power up BMC 185. In one instance, CPLD 190 may provide a signal to BMC 185 to power up. In another instance, CPLD 190 may provide a signal to a device that provides power to BMC 185. At 315, the BMC may power up. For example, BMC 185 may power up. For instance, BMC 185 may commence executing one or more portions of BMC FW 273. At 320, a digital signature of a first portion of IHSFW may be determined. For example, BMC 185 may determine a digital signature of a first portion of IHSFW 172. For instance, the first portion of IHSFW 172 may be or include an IBB. In one or more embodiments, determining the digital signature of the first portion of the IHSFW may include determining a hash value. For example, a hash value of the first portion of the IHSFW may be determined.

In one or more embodiments, determining a hash value of a portion of the IHSFW may include utilizing a one-way hash function of the portion of the IHSFW. In one example, a one-way hash function may be relatively easy to compute. For instance, for a value x (e.g., a number, a string, binary data, etc.) and a one-way hash function h, h(x) may be relatively easy to compute. In another example, a one-way hash function may significantly difficult to reverse. For instance, for the one-way hash function h and a value h(z), z may be significantly difficult to compute. In one or more embodiments, significantly difficult to compute may mean that it may take years to compute z from h(z), even if multiple computers were applied to such a task.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-224, SHA-256, SHA-512, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or said to be strengthened.

In one or more embodiments, determining the digital signature of the first portion of the IHSFW may include determining a cryptographic signature. For example, a cryptographic signature may be or include a hash value of a value combined with a public encryption key. For instance, determining a cryptographic signature of the first portion of the IHSFW may include combining the first portion of the IHSFW with a public encryption key and determining a hash value of a combination the first portion of the IHSFW with the public encryption key. In one or more embodiments, the public encryption key may be a public encryption key of BMC 185. For example, the public encryption key may be public encryption key 279.

At 325, a stored digital signature associated with the first portion of IHSFW may be retrieved from a memory medium. In one example, the memory medium may be or include non-volatile memory medium 170. For instance, BMC 185 may retrieve a stored digital signature associated with the first portion of IHSFW from non-volatile memory medium 170. In another example, the memory medium may be or include non-volatile memory medium 270. For instance, BMC 185 may retrieve a stored digital signature associated with the first portion of IHSFW from non-volatile memory medium 270.

At 330, it may be determined if the digital signature the first portion of the IHSFW matches the stored digital signature associated with the first portion of the IHSFW. For example, BMC 185 may determine if the digital signature the first portion of the IHSFW matches the stored digital signature associated with the first portion of the IHSFW. In one or more embodiments, if the first portion of the IHSFW has been modified, the digital signature the first portion of the IHSFW may not match the stored digital signature associated with the first portion of the IHSFW. For example, the first portion of the IHSFW may have been corrupted and/or compromised. For instance, if the first portion of the IHSFW has been corrupted and/or compromised, the digital signature the first portion of the IHSFW may not match the stored digital signature associated with the first portion of the IHSFW.

If the digital signature the first portion of the IHSFW does not match the stored digital signature associated with the first portion of the IHSFW, an IHSFW image may be stored in the memory medium where the IHSFW was retrieved, at 335. For example, the IHSFW image may be stored in non-volatile memory medium 170. For instance, BMC 185 may store IHSFW image 275 in non-volatile memory medium 170. In one or more embodiments, storing IHSFW image 275 in non-volatile memory medium 170 may include replacing one or more portions of IHSFW 172. For example, IHSFW image 275 may become IHSFW 172. For instance, IHSFW image 275 may become IHSFW 172 after IHSFW image 275 is stored in non-volatile memory medium 170. In one or more embodiments, replacing one or more portions of IHSFW 172 may include overwriting the one or more portions of IHSFW 172. In one or more embodiments, BMC 185 may be coupled to non-volatile memory medium 170. For example, BMC 185 may be coupled to non-volatile memory medium 170 via a SPI.

If the digital signature the first portion of the IHSFW matches the stored digital signature associated with the first portion of the IHSFW, at least one processor of the information handling system may be powered up, at 340. For example, BMC 185 may power up the at least one processor of the information handling system. For instance, BMC 185 may power up processor 120. In one or more embodiments, powering up the at least one processor of the information handling system may include releasing the at least one processor from a reset state and/or mode.

At 345, the at least one processor of the information handling system may execute the first portion of the IHSFW. For example, processor 120 may execute the IBB of IHSFW 172. At 350, a hash value of a second portion of the IHSFW may be determined. For example, the first portion of the IHSFW may determine the hash value of the second portion of the IHSFW. For instance, the IBB, executed by processor 120, may determine the hash value of the second portion of the IHSFW. In one or more embodiments, the second portion of the IHSFW may include one or more of MRC and PEI, among others.

At 355, it may be determined if the hash value the second portion of the IHSFW matches a stored hash value the second portion of the IHSFW. For example, the first portion of the IHSFW may determine if the hash value the second portion of the IHSFW matches a stored hash value the second portion of the IHSFW. For instance, the IBB, executed by processor 120, may determine if the hash value the second portion of the IHSFW matches a stored hash value the second portion of the IHSFW. In one or more embodiments, the first portion of the IHSFW may store the stored hash value the second portion of the IHSFW.

If the hash value the second portion of the IHSFW does not match the stored hash value the second portion of the IHSFW, the method may proceed to 335, according to one or more embodiments. If the hash value the second portion of the IHSFW matches the stored hash value the second portion of the IHSFW, CPLD contents may be received from a CPLD of the information handling system, at 360. For example, the at least one processor of the information handling system may receive the CPLD contents. For instance, processor 120 may receive the CPLD contents from CPLD 190. In one or more embodiments, the CPLD contents may include CPLD firmware.

At 365, a digital signature of the CPLD contents may be determined. For example, processor 120 may determine a digital signature of the CPLD contents. In one or more embodiments, determining the digital signature of the CPLD contents may include utilizing a CPLD signing key. For example, determining the digital signature of the CPLD contents may include determining a hash value of a combination of the CPLD contents and the CPLD signing key. In one or more embodiments, the second portion of the IHSFW may store the CPLD signing key. For example, the CPLD signing key may be or include a public encryption key. For instance, the CPLD signing key may be or include a public encryption key for a CPLD firmware image.

At 370, it may be determined if the digital signature of the CPLD contents matches a stored digital signature of the CPLD contents. For example, processor 120 may determine if the digital signature of the CPLD contents matches a stored digital signature of the CPLD contents. For instance, the second portion of the IHSFW may include the stored digital signature of the CPLD contents.

If the digital signature of the CPLD contents matches the stored digital signature of the CPLD contents, the CPLD may be locked, at 375. For example, processor 120 may lock CPLD 190. In one or more embodiments, when the CPLD is locked, firmware of the CPLD may not be altered or updated until the CPLD is reset. For example, when the CPLD is locked, firmware of the CPLD may not be altered or updated until IHS @10 is reset. In one or more embodiments, when the CPLD is locked, it may not provide further signals to one or more components of the information handling system. In one or more embodiments, locking the CPLD may include providing one or more signals to the CPLD. For example, one or more GPIO signals may be provided to the CPLD to lock the CPLD. In one or more embodiments, the CPLD may be unlocked when the CPLD is power cycled and/or is reset. For example, the CPLD may be unlocked when the information handling system is power cycled and/or is reset.

If the digital signature of the CPLD contents does not match the stored digital signature of the CPLD contents, information may be provided to the BMC, at 380. For example, the IHSFW may provide information to the BMC. For instance, the IHSFW may provide information to the BMC via a shared memory architecture (SMA). In one or more embodiments, the information may be or include a command. For example, the command may indicate that the BMC is to initiate a task to program the CPLD with a firmware image. For instance, programming the CPLD with a firmware image may include flashing the CPLD with a firmware image.

At 385, the IHSFW may boot to a firmware update mode. For example, the firmware update mode may permit the BMC to update firmware of one or more components of the information handling system. For instance, the firmware update mode may permit BMC 185 to update firmware of CPLD 190. In one or more embodiments, the firmware update mode may be or include a system service mode (SMM). In one or more embodiments, a firmware update mode may be or include a Lifecycle Controller, available from Dell Products, LP. For example, the Lifecycle Controller may enable operating system deployment with locally embedded driver repositories, firmware updates from local and/or network sources, hardware configuration, and/or platform-specific diagnostic routines, among others. In one instance, the Lifecycle Controller may be available for utilization when an operating system is not functional and/or not installed. In another instance, the Lifecycle Controller may provide flexibility in provisioning and/or customizing the information handling system to suit one or more requirements and/or configurations of the information handling system.

At 390, the CPLD may be programmed with a CPLD firmware image. For example, CPLD 190 may be programmed with CPLD FW image 274. In one instance, BMC 185 may program CPLD 190 with CPLD FW image 274. In another instance, BMC 185 may flash CPLD 190 with CPLD FW image 274. At 395, the information handling system may be restarted. For example, IHS 110 may be restarted. In one or more embodiments, restarting the information handling system may include power cycling the information handling system. In one or more embodiments, the method may proceed to 310.

Figure 4:
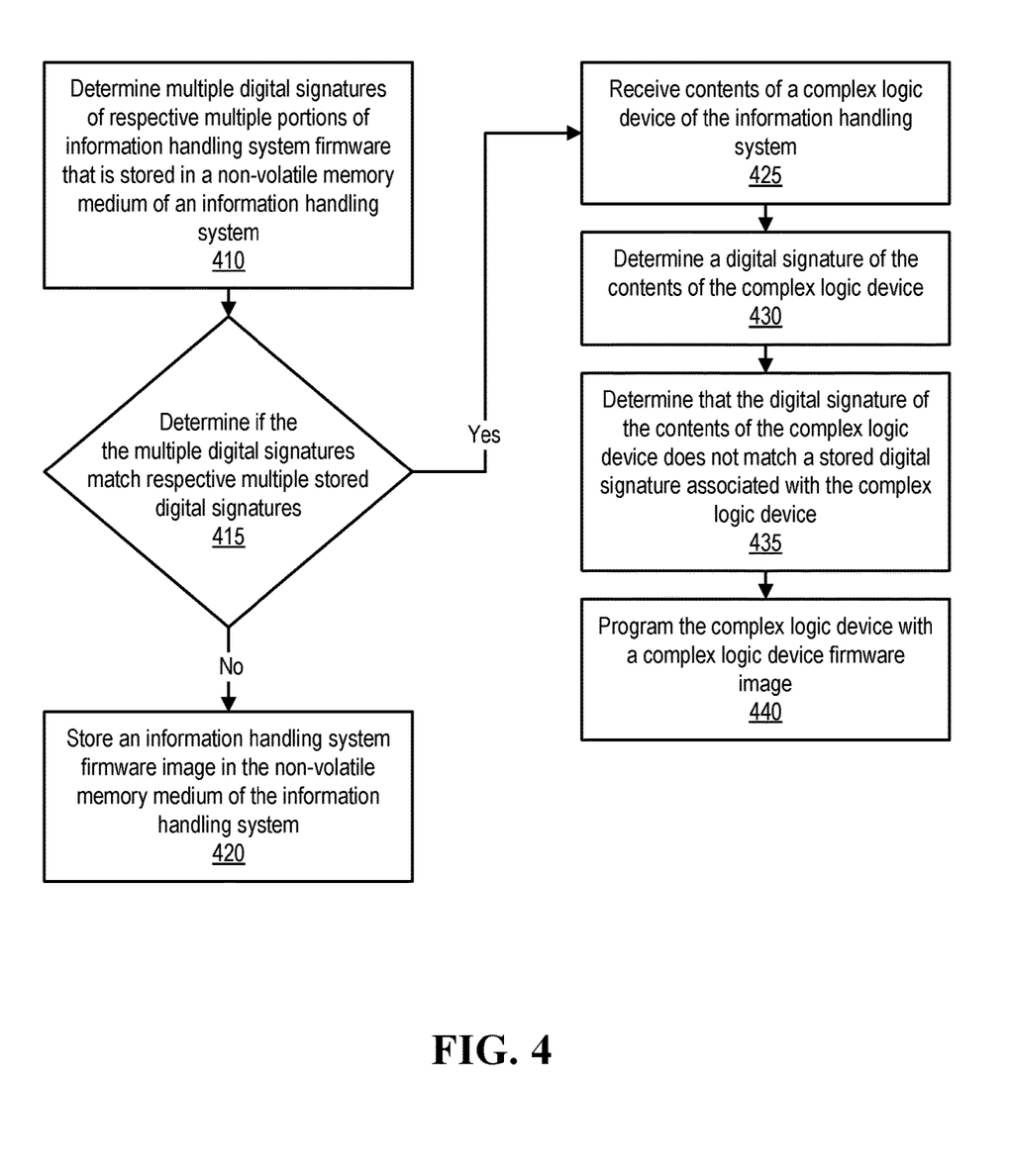
FIG. 4 illustrates another example of a method of utilizing an information handling system, according to one or more embodiments.

Turning now to FIG. 4, another example of a method of utilizing an information handling system is illustrated, according to one or more embodiments. At 410, multiple digital signatures of respective multiple portions of information handling system firmware that is stored in a non-volatile memory medium of an information handling system may be determined. In one or more embodiments, a first portion of the multiple portions of information handling system firmware may include an initial boot block. In one or more embodiments, a second portion of the multiple portions of information handling system firmware may include one or more of memory reference code and pre-EFI initialization instructions, among others. In one or more embodiments, the first portion of the multiple portions of information handling system firmware may include a stored digital signature of the multiple stored digital signatures associated with a second portion of the multiple portions of information handling system firmware.

At 415, it may be determine if the multiple digital signatures match respective multiple stored digital signatures. If the multiple digital signatures do not match the respective multiple stored digital signatures, an information handling system firmware image may be stored in the non-volatile memory medium of the information handling system, at 420. In one or more embodiments, method element 420 may be performed in accordance with method element 335 of FIG. 3. If the multiple digital signatures match the respective multiple stored digital signatures, contents of a complex logic device of the information handling system may be received, at 425.

At 430, a digital signature of the contents of the complex logic device may be determined. For example, the digital signature of the contents of the complex logic device may be or include a hash value associated with the digital signature of the contents of the complex logic device. In one or more embodiments, the information handling system firmware may store stores a complex logic device key. In one example, determining the digital signature of the contents of the complex logic device may include combining the contents of the complex logic device and the complex logic device key. In another example, determining the digital signature of the contents of the complex logic device may include determining a hash value of a combination of the contents of the complex logic device and the complex logic device key as the digital signature of the contents of the complex logic device.

At 435, it may be determined that the digital signature of the contents of the complex logic device does not match a stored digital signature associated with the complex logic device. At 440, program the complex logic device with a complex logic device firmware image. In one or more embodiments, programming the complex logic device with the complex logic device firmware image may be performed in response to determining that the digital signature of the contents of the complex logic device does not match the stored digital signature associated with the complex logic device.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a complex logic device;
   at least one processor; and
   a non-volatile memory medium, coupled to the at least one processor, that stores instructions executable by the at least one processor, which when executed by the at least one processor, cause the information handling system to:
   determine a plurality of digital signatures of a respective plurality of portions of information handling system firmware that is stored in the non-volatile memory medium;
   determine if the plurality of digital signatures match a respective plurality of stored digital signatures;
   if the plurality of digital signatures do not match the respective plurality of stored digital signatures, store an information handling system firmware image in the non-volatile memory medium;
   if the plurality of digital signatures match the respective plurality of stored digital signatures, receive contents of the complex logic device;
   determine a digital signature of the contents of the complex logic device;
   determine that the digital signature of the contents of the complex logic device does not match a stored digital signature associated with the complex logic device;
   in response to determining that the digital signature of the contents of the complex logic device does not match the stored digital signature associated with the complex logic device, program the complex logic device with a complex logic device firmware image.

2. The information handling system of claim 1, wherein a first portion of the plurality of portions of information handling system firmware includes an initial boot block.

3. The information handling system of claim 1, wherein a first portion of the plurality of portions of information handling system firmware includes a stored digital signature of the plurality of stored digital signatures associated with a second portion of the plurality of portions of information handling system firmware.

4. The information handling system of claim 1, further comprising:
a boot management controller coupled to the complex logic device;
wherein the boot management controller stores the complex logic device firmware image; and
wherein, to program the complex logic device with the complex logic device firmware image, the instructions further cause the boot management controller to program the complex logic device with the complex logic device firmware image.

5. The method of claim 4, wherein the instructions further cause the information handling system firmware to provide a command to the boot management controller to program the complex logic device in response to determining that the digital signature of the contents of the complex logic device does not match the stored digital signature associated with the complex logic device.

6. The information handling system of claim 1, wherein the instructions further cause the information handling system firmware to boot into a firmware update mode in response to determining that the digital signature of the contents of the complex logic device does not match the stored digital signature associated with the complex logic device.

7. The information handling system of claim 1,
herein the information handling system firmware stores a complex logic device key; and
wherein, to determine the digital signature of the contents of the complex logic device, the instructions further cause the information handling system to:
combine the contents of the complex logic device and the complex logic device key; and
determine a hash value of a combination of the contents of the complex logic device and the complex logic device key as the digital signature of the contents of the complex logic device.

8. A method, comprising:
determining a plurality of digital signatures of a respective plurality of portions of information handling system firmware that is stored in a non-volatile memory medium of an information handling system;
determining if the plurality of digital signatures match a respective plurality of stored digital signatures;
if the plurality of digital signatures do not match the respective plurality of stored digital signatures, storing an information handling system firmware image in the non-volatile memory medium of the information handling system;
if the plurality of digital signatures match the respective plurality of stored digital signatures, receiving contents of a complex logic device of the information handling system;
determining a digital signature of the contents of the complex logic device;

determining that the digital signature of the contents of the complex logic device does not match a stored digital signature associated with the complex logic device;
in response to the determining that the digital signature of the contents of the complex logic device does not match the stored digital signature associated with the complex logic device, programming the complex logic device with a complex logic device firmware image.

9. The method of claim 8, wherein a first portion of the plurality of portions of information handling system firmware includes an initial boot block.

10. The method of claim 8, wherein a first portion of the plurality of portions of information handling system firmware includes a stored digital signature of the plurality of stored digital signatures associated with a second portion of the plurality of portions of information handling system firmware.

11. The method of claim 8,
wherein the information handling system includes a boot management controller;
wherein the boot management controller stores the complex logic device firmware image; and
wherein the programming the complex logic device with the complex logic device firmware image includes the boot management controller programming the complex logic device with the complex logic device firmware image.

12. The method of claim 11, further comprising:
in response to the determining that the digital signature of the contents of the complex logic device does not match the stored digital signature associated with the complex logic device, the information handling system firmware providing a command to the boot management controller to program the complex logic device.

13. The method of claim 8, further comprising:
in response to the determining that the digital signature of the contents of the complex logic device does not match the stored digital signature associated with the complex logic device, the information handling system firmware booting into a firmware update mode.

14. The method of claim 8,
wherein the information handling system firmware stores a complex logic device key; and
wherein the determining the digital signature of the contents of the complex logic device includes:
combining the contents of the complex logic device and the complex logic device key; and
determining a hash value of a combination of the contents of the complex logic device and the complex logic device key as the digital signature of the contents of the complex logic device.

15. A computer-readable non-transitory memory medium that includes instructions that, when executed by at least one processor of an information handling system, cause the information handling system to:
determine a plurality of digital signatures of a respective plurality of portions of information handling system firmware that is stored in a non-volatile memory medium of the information handling system;
determine if the plurality of digital signatures match a respective plurality of stored digital signatures;
if the plurality of digital signatures do not match the respective plurality of stored digital signatures, store an information handling system firmware image in the non-volatile memory medium of the information handling system;

if the plurality of digital signatures match the respective plurality of stored digital signatures, receive contents of a complex logic device of the information handling system;

determine a digital signature of the contents of the complex logic device;

determine that the digital signature of the contents of the complex logic device does not match a stored digital signature associated with the complex logic device;

in response to determining that the digital signature of the contents of the complex logic device does not match the stored digital signature associated with the complex logic device, program the complex logic device with a complex logic device firmware image.

16. The computer-readable non-transitory memory medium of claim 15, wherein a first portion of the plurality of portions of information handling system firmware includes an initial boot block.

17. The computer-readable non-transitory memory medium of claim 15, wherein a first portion of the plurality of portions of information handling system firmware includes a stored digital signature of the plurality of stored digital signatures associated with a second portion of the plurality of portions of information handling system firmware.

18. The computer-readable non-transitory memory medium of claim 15, wherein the information handling system includes a boot management controller;

wherein the boot management controller stores the complex logic device firmware image; and wherein, to program the complex logic device with the complex logic device firmware image, the instructions further cause the boot management controller to program the complex logic device with the complex logic device firmware image.

19. The computer-readable non-transitory memory medium of claim 15, wherein the instructions further cause the information handling system to boot into a firmware update mode in response to determining that the digital signature of the contents of the complex logic device does not match the stored digital signature associated with the complex logic device.

20. The computer-readable non-transitory memory medium of claim 15, wherein the information handling system firmware stores a complex logic device key; and wherein, to determine the digital signature of the contents of the complex logic device, the instructions further cause the information handling system to:

combine the contents of the complex logic device and the complex logic device key; and determine a hash value of a combination of the contents of the complex logic device and the complex logic device key as the digital signature of the contents of the complex logic device.

* * * * *